(12) United States Patent
Wilson et al.

(10) Patent No.: US 10,693,230 B1
(45) Date of Patent: Jun. 23, 2020

(54) DYNAMIC DIRECTIONALITY FOR MOBILE AD-HOC NETWORKS

(71) Applicant: Rockwell Collins, Inc., Cedar Rapids, IA (US)

(72) Inventors: Tyler J. Wilson, Springville, IA (US); Brian L. Aanderud, Carver, MN (US); Scott C. Bjornsen, Marion, IA (US); Donald F. Hovda, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 805 days.

(21) Appl. No.: 13/861,468

(22) Filed: Apr. 12, 2013

(51) Int. Cl.
*H01Q 3/34* (2006.01)

(52) U.S. Cl.
CPC .................................... *H01Q 3/34* (2013.01)

(58) Field of Classification Search
CPC ........................................................ H01Q 3/34
USPC ........................................................ 342/372
See application file for complete search history.

(56) References Cited

U.S. PATENT DOCUMENTS

| 7,085,541 | B2* | 8/2006 | Redi | H04W 52/10 342/367 |
| 8,630,590 | B2* | 1/2014 | Nanda | H01Q 1/246 343/757 |
| 2005/0074019 | A1* | 4/2005 | Handforth | H04L 12/44 370/406 |
| 2009/0034491 | A1* | 2/2009 | Adams | H04W 72/1226 370/337 |
| 2009/0098898 | A1* | 4/2009 | Patterson | H04L 1/0014 455/521 |
| 2013/0143592 | A1* | 6/2013 | Brisebois | H04W 24/02 455/456.1 |

\* cited by examiner

*Primary Examiner* — Vladimir Magloire
*Assistant Examiner* — Helena H Seraydaryan
(74) *Attorney, Agent, or Firm* — Suiter Swantz pc llo

(57) ABSTRACT

Directional transmission in a mobile ad-hoc network includes receiving position data for peer nodes in the network. When transmitting a data packet to a peer node, the position of the peer node is determined with reference to a position database. An electronically steerable antenna is focused to transmit to the position and the packet is transmitted. The electronically steerable antenna is then placed in an omnidirectional mode to receive packet transmissions.

12 Claims, 2 Drawing Sheets

DYNAMIC DIRECTIONALITY FOR MOBILE AD-HOC NETWORKS

FIELD OF THE INVENTION

The present invention is directed generally toward ad-hoc networks, and more particularly to ad-hoc networks implemented with electronically steerable antennas.

BACKGROUND OF THE INVENTION

Mobile ad-hoc networks are traditionally omnidirectional in design. The use of omnidirectional data transmission results in limitations to link budget which affects throughput, range performance and security. Additionally, omnidirectional transmissions add to complications in system scalability, due to the interference range footprint which results from their operation.

Consequently, it would be advantageous if an apparatus existed that is suitable for utilizing directional antennas in mobile ad-hoc networks.

SUMMARY OF THE INVENTION

Accordingly, the present invention is directed to a novel method and apparatus for utilizing directional antennas in mobile ad-hoc networks.

One embodiment of the present invention is a method for implementing directional transmission in a mobile ad-hoc network. The method includes receiving position data for peer nodes in the network. When transmitting a data packet to a peer node, the position of the peer node is determined with reference to a position database. An electronically steerable antenna is focused to transmit to the position and the packet is transmitted. The electronically steerable antenna is then placed in an omnidirectional mode to receive packet transmissions.

Another embodiment of the present invention is a computer system with a data store, a processor and an electronically steerable antenna. The processor determines a position of a peer node and applies a signal to the electronically steerable antenna to direct a transmission toward the position. The processor then places the electronically steerable antenna in an omnidirectional mode.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
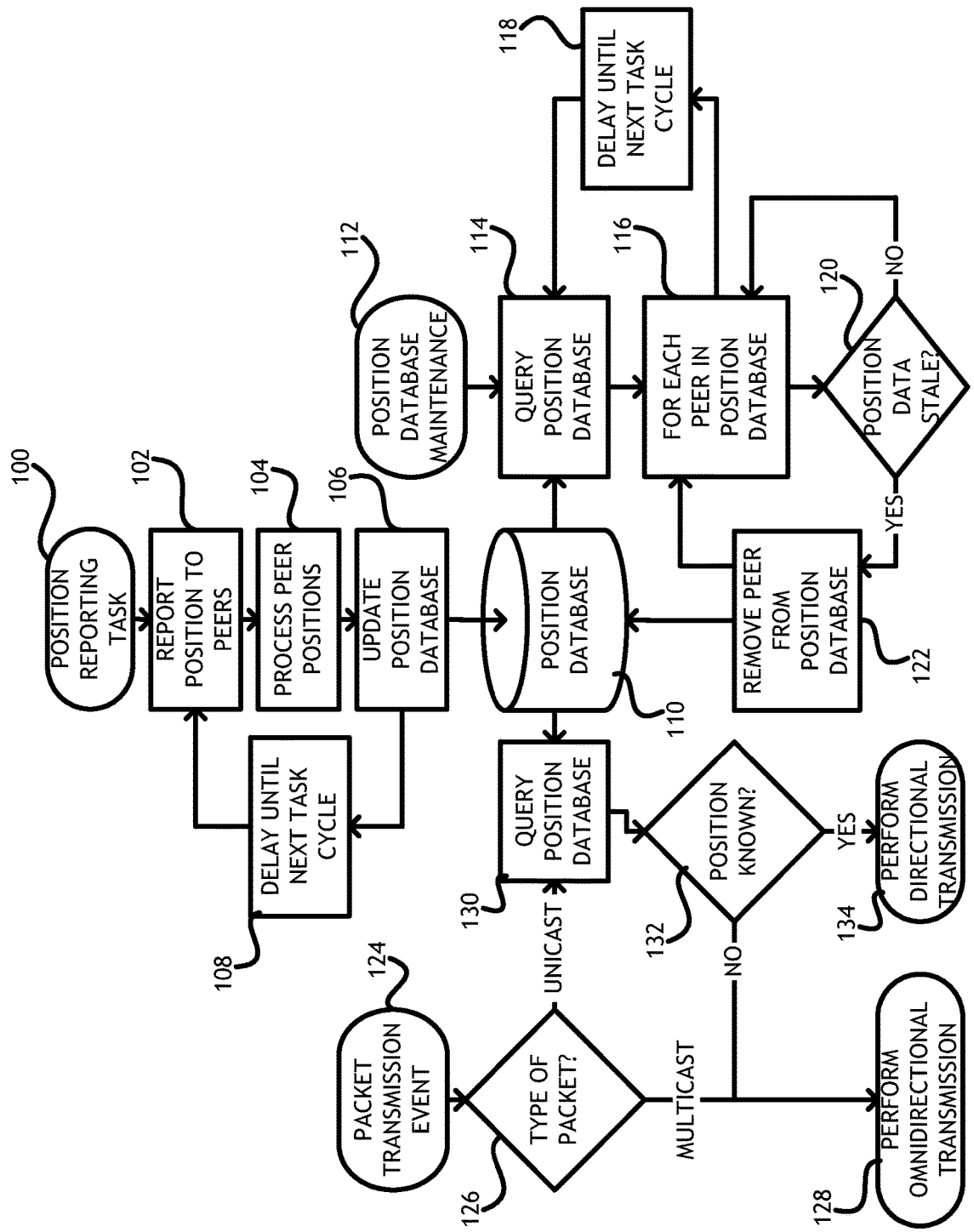
FIG. 1 shows a flowchart of a method for dynamically utilizing an electronically steerable antenna in a mobile ad-hoc network.

Referring to FIG. 1, a flowchart of a method for dynamically utilizing an electronically steerable antenna in a mobile ad-hoc network is shown. A node in a mobile ad-hoc network may perform a position reporting task 100 wherein the node reports 102 its position to other nodes in the mobile ad-hoc network. The node may determine its position with reference to a global positioning system (GPS), inertial navigational system or any other location determining mechanism with sufficient specificity. Likewise, the node may process 104 positions of other nodes (peer nodes) in the mobile ad-hoc network when such positions are received from the peer nodes and update 106 a position database 110 storing the known absolute and/or relative positions of nodes in the mobile ad-hoc network. When possible, a node may process 104 positions of peer nodes in the mobile ad-hoc network based on a relative change in the position of the processing node as compared to a previous processing cycle. A node may perform a full power, omnidirectional transmission to initially discover the positions of peer nodes. Nodes in a mobile ad-hoc network may communicate with a network manager that maintains position information for the nodes; in such a system, the node may report 102 its position through the network manager and receive peer node positions through the network manager. The position reporting task 100 may be cyclical such that as the position database 110 is updated 106 with new position information, the task enters a delay 108 for some predetermined period of time before reporting 102 the processing node's position to peer nodes in a subsequent position reporting task 100 cycle.

With a database of node positions in a mobile ad-hoc network, a node may perform packet transmissions 124 to a specific peer node using directional transmission techniques. The node determines 126 the type of packet transmission. If the transmission is a multicast or broadcast transmission, the node places an antenna in an omnidirectional transmission mode and performs 128 an omnidirectional transmission of the packet. However, if the transmission is a unicast transmission, the node queries 130 the position database 110 to determine the position of the target peer node. Based on the results of the query 130, the node determines 132 if the position of the target peer node is known. If the position of the target peer node is not known, the node performs 128 an omnidirectional transmission of the packet. If the position of the target peer node is known, the node performs 134 a directional transmission of the packet.

Directional transmission involves determining an angle and elevation based on the known location of the node, the known location of the target peer node and the orientation of an electronically steerable antenna. Signals are applied to the electronically steerable antenna to produce an interference pattern designed to direct transmission toward the target peer node. Once a packet is directionally transmitted, the electronically steerable antenna is placed in an omnidirectional receiving mode. Generally, all transmissions are received with the electronically steerable antenna in an omnidirectional mode because the node cannot know in advance the position where received transmissions will originate. Because transmissions may be sent in a directional mode but are received in an omnidirectional mode, the node may include a mechanism for quickly switching the electronically steerable antenna between a directional and omnidirectional mode. Fast switching is necessary to continue reliably receiving transmissions.

Directional transmission allows a node to focus radio-frequency (RF) power. Focusing RF power provides superior transmission range and throughput. Focusing RF power may also reduce or combat interference. Furthermore, directional transmission may enhance security by reducing the probability of interception.

In order to continue performing 134 directional transmissions, the position database may undergo maintenance 112. The node queries 114 the position database 110 for the position of all peer nodes. The node then iterates 116 through each peer node to determine 120 if the position data associated with each peer node is stale. Stale data may be determined 120 based on a predetermined length of time since such position data was last updated. If the position data associated with a current peer node is stale, the position data is removed 122 from the position database 110 and the position data for the next peer node is examined. If the position data associated with a current peer node is not stale, the position data is maintained and the position data for the next peer node is examined. When the currency of all peer nodes in the position database 110 is confirmed, the maintenance task may enter a delay 118 for some predetermined period of time before querying 114 the position database 110 again.

Figure 2:
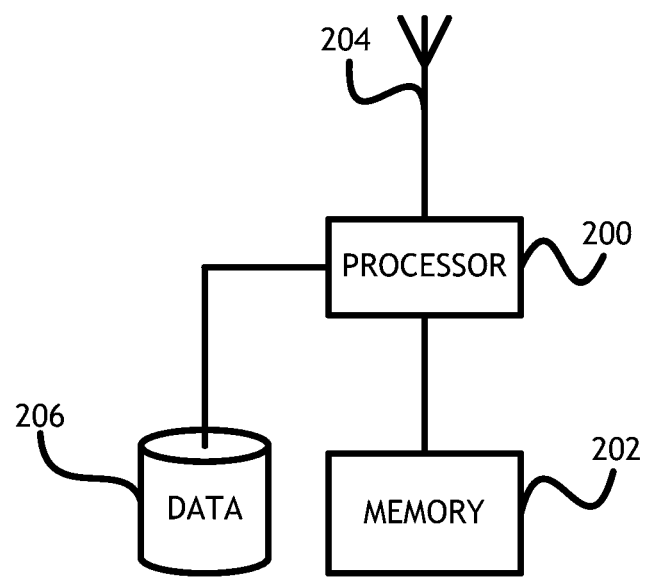
FIG. 2 shows a computer system useful for implementing embodiments of the present invention.

Referring to FIG. 2, a computer system useful for implementing embodiments of the present invention is shown. A node in a mobile ad-hoc network includes a processor 200, memory connected to the processor 202, an electronically steerable antenna 204 connected to the processor 200 and a position database 206 connected to the processor 200. The processor 200 may transmit its position to other nodes in the mobile ad-hoc network through the electronically steerable antenna 204 while in an omnidirectional mode. The processor 200 may determine its position with reference to a global positioning system (GPS), inertial navigational system or any other location determining mechanism with sufficient specificity. Likewise, the processor 200 may receive position data for peer nodes through the electronically steerable antenna 204, or derive such data based on the known position of the processor 200, and store such position data in the position database 206. The processor 200 may transmit and receive updated position data cyclically, and periodically delay updates according to a predetermined length of time.

With an up-to-date position database 206, the processor 200 may perform packet transmissions to a specific peer node using directional transmission techniques through the electronically steerable antenna 204. The processor 200 determines the type of packet transmission. If the transmission is a multicast or broadcast transmission, the processor 200 places the electronically steerable antenna 204 in an omnidirectional transmission mode and performs an omnidirectional transmission of the packet. However, if the transmission is a unicast transmission, the processor 200 queries the position database 206 to determine the position of the target peer node. Based on the results of the query, the processor 200 determines if the position of the target peer node is known. If the position of the target peer node is not known, the processor 200 performs an omnidirectional transmission of the packet. If the position of the target peer node is known, the processor 200 performs a directional transmission of the packet.

Directional transmission involves determining an angle and elevation based on the known location of the processor 200, the known location of the target peer node and the orientation of the electronically steerable antenna 204. Signals are applied to the electronically steerable antenna 204 to produce an interference pattern designed to direct transmission toward the target peer node. Once a packet is directionally transmitted, the processor 200 places the electronically steerable antenna 204 in an omnidirectional receiving mode. Generally, all transmissions are received with the electronically steerable antenna 204 in an omnidirectional mode because the processor 200 cannot know in advance the position where received transmissions will originate. Because transmissions may be sent in a directional mode but are received in an omnidirectional mode, the processor 200 may include a mechanism for quickly switching the electronically steerable antenna 204 between a directional and omnidirectional mode. Fast switching is necessary to continue reliably receiving transmissions.

In order to continue performing directional transmissions, the position database 206 may undergo periodic maintenance. The processor 200 queries the position database 206 for the position of all peer nodes. The processor 200 then iterates through each peer node to determine if the position data associated with each peer node is stale. The processor 200 may determine if position data is stale based on a predetermined length of time since such position data was last updated. If the position data associated with a current peer node is stale, the processor 200 removes such position data and position data for the next peer node is examined. If the position data associated with a current peer node is not stale, the position data is maintained and position data for the next peer node is examined. When the processor 200 has confirmed the currency of all peer nodes in the position database 206, the maintenance task may enter a delay for some predetermined period of time before querying the position database 206 again.

Assuming a twelve sector electronically steerable antenna 204 with six dBi directional gain, embodiments of the present invention may yield twelve times signal-in-space interference reduction when used to augment existing systems; two times increase of maximum range of all waveform modes; four times increase in single node coverage area; and fifty percent reduction in multi-hop transmissions due to reduced hop count to reach a final destination when used to facilitate SWAP-C reduction.

Mobile ad-hoc networks may comprise nodes incorporated into moving platforms. Therefore, a computer system implementing embodiments of the present invention may be incorporated into aircraft or other vehicles.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus comprising:
   a processor;
   an electronically steerable antenna connected to the processor;
   a peer node position database connected to the processor, configured to store positions of nodes in a mobile ad-hoc-network;
   a memory connected to the processor; and computer executable program code configured to execute on the processor,
wherein the computer executable program code is configured to:
    periodically report a position value associated with the computer apparatus to two or more peer nodes;
    receive one or more peer node position values associated with one or more peer nodes;
    store the one or more peer node position values in the peer node position database;
    calculate a current position of the one or more peer nodes based on a relative change of peer node position values and a change in position values associated with the computer apparatus between periodic reporting cycles;
    determine that at least one peer node position value is out-of-date based on a predetermined length of time since a prior position update;
    remove the at least one peer node position value from the peer node position database;
    identify a message for a target node;
    determine if a position of the target node is known with reference to the peer node position database;
    upon determining that the position of the target node is known:
        determine one or more signals configured to focus the electronically steerable antenna toward the position of the target node;
        apply the one or more signals to the electronically steerable antenna; and
        transmit the message to the target node with the electronically steerable antenna in a directional mode; and
    upon determining that the position of the target node is unknown:
        transmit the message with the electronically steerable antenna in an omnidirectional mode.

2. The computer apparatus of claim 1, wherein the computer executable program code is further configured to place the electronically steerable antenna into an omnidirectional mode.

3. The computer apparatus of claim 2, wherein transmitting the position value comprises a full power, omnidirectional transmission.

4. The computer apparatus of claim 1, wherein the computer executable program code is further configured to:
    receive one or more updated peer node position values associated with one or more peer nodes in the peer node position database; and
    update one or more peer node position values in the peer node position database based on the one or more updated peer node position values.

5. The computer apparatus of claim 1, wherein the computer executable program code is further configured to receive initial position data associated with one or more peer nodes from a network manager.

6. A method for directional transmission in a mobile ad-hoc network comprising:
    periodically reporting a position value associated with a current node to two or more peer nodes;
    receiving one or more peer node position values associated with one or more peer nodes;
    storing the one or more peer node position values in the peer node position database;
    calculating a current position of the one or more peer nodes based on a relative change of peer node position values and a change in position values associated with the computer apparatus between periodic reporting cycles;
    determining that at least one peer node position value is out-of-date based on a predetermined length of time since a prior position update;
    removing the at least one peer node position value from the peer node position database;
    identifying a message for a target node;
    determining if a position of the target node is known based on a peer node position database;
    upon determining that the position of the target node is known:
        determining one or more signals configured to focus an electronically steerable antenna toward the position of the target node;
        applying the one or more signals to an electronically steerable antenna;
        transmitting the message to the target node with the electronically steerable antenna in a directional mode; and
    upon determining that the position of the target node is unknown:
        transmit the message with the electronically steerable antenna in an omnidirectional mode.

7. The method of claim 6, further comprising placing an electronically steerable antenna into an omnidirectional mode.

8. The method of claim 7, wherein transmitting the position value comprises a full power, omnidirectional transmission.

9. The method of claim 6, further comprising:
    receiving one or more updated peer node position values associated with one or more peer nodes in a peer node position database; and
    updating one or more peer node position values in a peer node position database based on the one or more updated peer node position values.

10. The method of claim 6, further comprising receiving initial position data associated with one or more peer nodes from a network manager.

11. A mobile platform comprising:
    a computer comprising:
        a processor;
        a twelve sector electronically steerable antenna connected to the processor, mounted in a known orientation to the mobile platform; and
        a peer node position database connected to the processor, configured to store positions of nodes in a mobile ad-hoc-network,
    wherein the processor is configured to:
        periodically report a position value associated with the mobile platform to one or more peer nodes;
        receive one or more peer node position values associated with one or more peer nodes;
        store the one or more peer node position values in the peer node position database;
        calculate a current position of the one or more peer nodes based on a relative change of peer node position values and a change in position values associated with the computer apparatus between periodic reporting cycles;
        determine that at least one peer node position value is out-of-date based on a predetermined length of time since a prior position update;
        remove the at least one peer node position value from the peer node position database;

identify a message for a target node;
query the peer node position database;
determine if a position of the target node is known from the peer node position database;
upon determining that the position of the target node is known:
  determine one or more signals configured to focus the twelve sector electronically steerable antenna toward the position;
  apply the one or more signals to the twelve sector electronically steerable antenna;
  transmit the message to the target node with the electronically steerable antenna in a directional mode; and
upon determining that the position of the target node is unknown:
  transmit the message with the electronically steerable antenna in an omnidirectional mode.

12. The mobile platform of claim 11, wherein the processor is further configured to:
  receive one or more updated peer node position values associated with one or more peer nodes in the peer node position database; and
  update one or more peer node position values in the peer node position database based on the one or more updated peer node position values.

\* \* \* \* \*